E. U. HARRISON.
MULTIPLE SPINDLE AUTOMATIC LATHE.
APPLICATION FILED JULY 25, 1905.

928,382.

Patented July 20, 1909.
11 SHEETS—SHEET 2.

FIG 2

WITNESSES;
George G. Schwenlauk
N. H. Berrigan

INVENTOR,
EDWARD UNDERHILL HARRISON,
BY  H. Van Ohrenmel
HIS ATTORNEY.

E. U. HARRISON.
MULTIPLE SPINDLE AUTOMATIC LATHE.
APPLICATION FILED JULY 25, 1905.

928,382.

Patented July 20, 1909.
11 SHEETS—SHEET 4.

WITNESSES;
George G. Schoenlank
W. H. Berrigan

INVENTOR,
EDWARD UNDERHILL HARRISON,
BY J. Van Osterweel
HIS ATTORNEY.

E. U. HARRISON.
MULTIPLE SPINDLE AUTOMATIC LATHE.
APPLICATION FILED JULY 25, 1905.

928,382.

Patented July 20, 1909.
11 SHEETS—SHEET 5.

WITNESSES:
George G. Schwenlan
W. H. Berrigan

INVENTOR,
EDWARD UNDERHILL HARRISON,
BY
HIS ATTORNEY.

E. U. HARRISON.
MULTIPLE SPINDLE AUTOMATIC LATHE.
APPLICATION FILED JULY 25, 1905.

928,382.

Patented July 20, 1909.
11 SHEETS—SHEET 6.

WITNESSES:
George G. Schoenlank

INVENTOR,
EDWARD UNDERHILL HARRISON,
BY
HIS ATTORNEY.

E. U. HARRISON.
MULTIPLE SPINDLE AUTOMATIC LATHE.
APPLICATION FILED JULY 25, 1905.

928,382.

Patented July 20, 1909.
11 SHEETS—SHEET 9.

WITNESSES;
George G. Schoenlank

INVENTOR,
EDWARD UNDERHILL HARRISON,
BY
HIS ATTORNEY.

E. U. HARRISON.
MULTIPLE SPINDLE AUTOMATIC LATHE.
APPLICATION FILED JULY 25, 1905.

928,382.

Patented July 20, 1909.
11 SHEETS—SHEET 10.

WITNESSES:
George G. Schoenlank
A. H. Berrigan

INVENTOR,
EDWARD UNDERHILL HARRISON,
BY  H. van Oldenneel
HIS ATTORNEY.

UNITED STATES PATENT OFFICE.

EDWARD UNDERHILL HARRISON, OF BIRMINGHAM, ENGLAND.

MULTIPLE-SPINDLE AUTOMATIC LATHE.

No. 928,382.          Specification of Letters Patent.          Patented July 20, 1909.

Application filed July 25, 1905. Serial No. 271,157.

*To all whom it may concern:*

Be it known that I, EDWARD UNDERHILL HARRISON, a subject of the King of Great Britain, residing at Ashley Cottage, Coxwell Road, Ladywood, Birmingham, in the county of Warwick, England, have invented a new and useful Improvement in Multiple-Spindle Automatic Lathes; and I do hereby declare the following to be a full, clear, and exact description of the same.

This invention relates to automatic screw making and metal turning machines of that class in which a series of rods of material may be operated upon simultaneously, by independent tools having separate and distinct functions; and wherein means are provided for automatically presenting each rod of the series after being operated upon by one tool, to the action of the next adjacent tools, and successively to the remaining tools of the series, whereby a plurality of rods will undergo separate and distinct operations simultaneously, and whereby, after the first complete cycle of operations of the machine, one article will be completed at each successive advancement of the work.

My invention comprises improvements in multiple spindle automatic lathes, and consists of a number of improvements in the general operation and details, whereby the action of the whole machine is simplified and improved.

Multiple spindle automatic lathes according to my invention are driven by one belt running in one direction only. The main bed is cast in one piece, whereby the machine is made more rigid and stronger in use. The advancing of the end tools is effected by means, whereby the amount of advance is regulated in a simple manner without the necessity for the interchange of parts, while the screwing die is rotated at various speeds without the interchange of wheels. A quick rotation of the work spindle cylinder and quick receding of the end tool holder is effected by the employment of a friction clutch automatically operated. The operation of the side tools is also improved by the employment of a separate cam path and separate actuating means for each tool, the tools approaching the work radially, thereby giving more clearance to the work and facilitating the removal of the turnings. The rotation of the work spindle cylinder is made safer and more effective than hitherto.

In order that my invention may be clearly understood and more readily carried into practical effect, I have appended hereunto eleven sheets of drawings, illustrating the same, in which:—

in Fig. 2. in Fig. 14. Fig. 17: is a sectional view of the headstock at E. F. in Fig. 16, showing also the radial tool actuating rocking shafts and rollers. Fig. 18: is an elevation of the cone bearing or bush employed for mounting the work spindles. Fig. 19: is an end view of the same. Fig. 20: is a sectional elevation along the cam shaft showing the gear by which the work spindle cylinder and cam drum are rotated and the lock bolt actuated. Fig. 21: is a sectional view of the same at G. H. in Fig. 20.

In the construction of an automatic multiple spindle lathe according to my invention as shown upon the accompanying drawings, I employ a main bed or casting 1. mounted upon a pan 2. for the reception of the turnings and oil. At one end of the bed a saddle 3. is bolted to its upper surface, while at the other end of the bed 1. is a fixed headstock 4. cast integral with the bed. A driving shaft 5. is provided above the bed which operates the end tools in the holder 6. and gear box 7. and work spindles in the headstock 4. A cam shaft 9. extends from end to end of the machine below the surface of the bed 1. and controls the advancing and receding of the end tool holder 6. and the rotation of the work spindle cylinder and cam drum, which latter operates the tools in the radial holder 8.

The machine is operated by a belt driving the pulley 10. keyed upon a short longitudinal shaft 11. mounted in a bearing on the saddle 3. this shaft 11. carrying a skew gear wheel 12. and a spur wheel 13. which latter gears with a long pinion 14. mounted freely upon a short shaft or stud 15. secured to a bearing or lug on the saddle and being above the shaft 11. This long pinion 14. gears with a spur wheel 16. keyed upon the main driving shaft 5. which it rotates. The aforesaid "skew" gear wheel 12. gears with another "skew" gear wheel 17. secured upon a sleeve 18. by means of a key 19. This sleeve 18. is mounted at right angles to the main driving shaft 5. and is carried by a bearing upon the saddle 3. and through it passes a hollow shaft 20. extending from front to back of the machine. Upon the hollow shaft 20. and secured thereto by a screw 21. is a worm 22. gearing with a worm wheel 23. keyed upon the cam shaft 9. which it rotates.

On the cam shaft 9. is mounted a cam 24. for actuating the end tool holder 6. On the periphery of this cam 24. is a strap 25. in contact with a vertical roller 26. on the top of the bracket 27. sliding upon the pins 28. secured in the bed 1. Secured to the bracket 27. are duplicate links 29. pivotally secured to another set of duplicate links 30. by means of a crosshead 31. sliding in slots in the links 30, the position of the said crosshead 31. in the slots being adapted to be adjusted by means of a screw 32. secured to the links 30. and passing through the crosshead 31. for the purpose hereinafter set forth. The links are pivoted upon the cam shaft 9. by means of a loose collar retained in position by two fixed collars 33. The upper ends of the said links 30. are pivotally secured to horizontal links 34, which are in turn secured to the end tool holder 6, by means of an attachment piece 35. When the cam shaft 9. and cam 24. are rotated the bracket 27. is moved endwise by means of the cam strap 25. thereby moving the lower end of the links 30. to the right and consequently the links 34. and end tool holder 6. to the left and bringing the tools into contact with the work. To regulate the amount of movement of the end tool holder 6. the screw 32. is rotated thereby altering the length of travel of the upper end of the links 30, the amount of movement of the sliding bracket 27. being constant.

Figure 1:
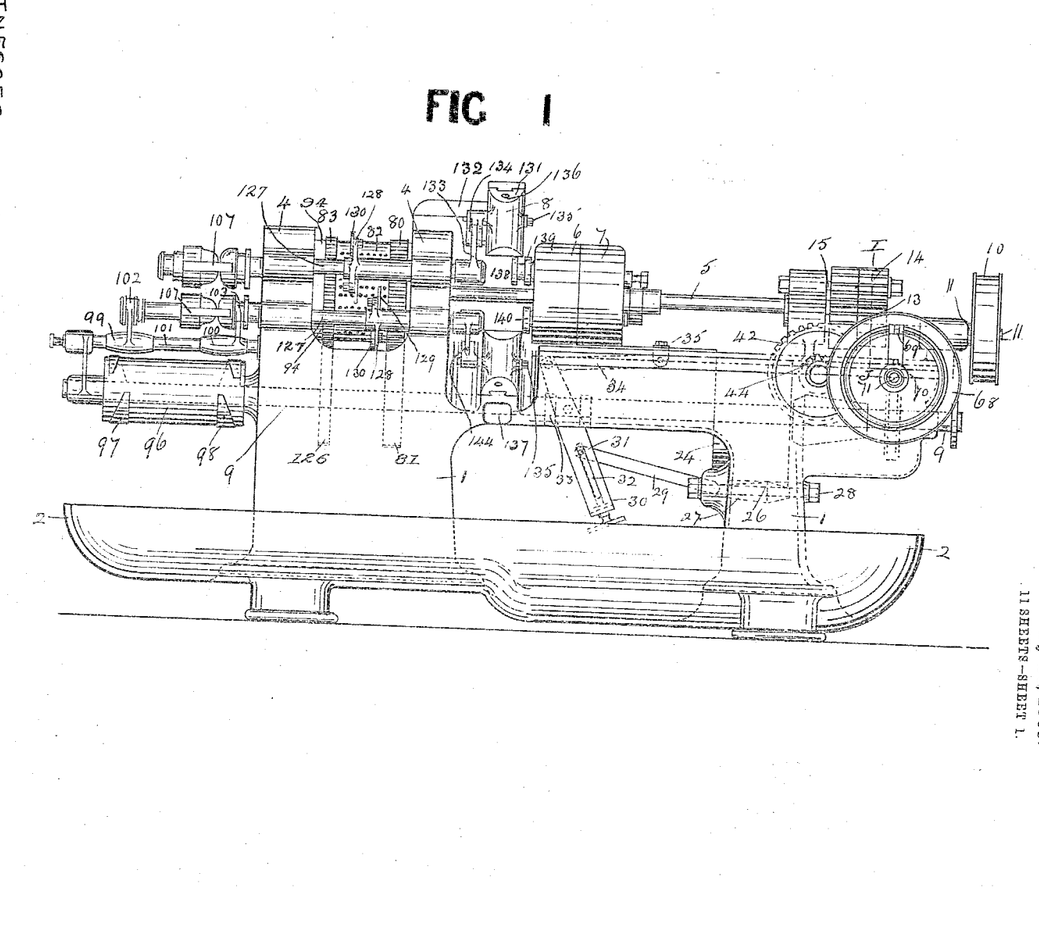
Figure 1: is a front elevation of a multiple spindle automatic lathe assembled ready for use.
Figure 2:
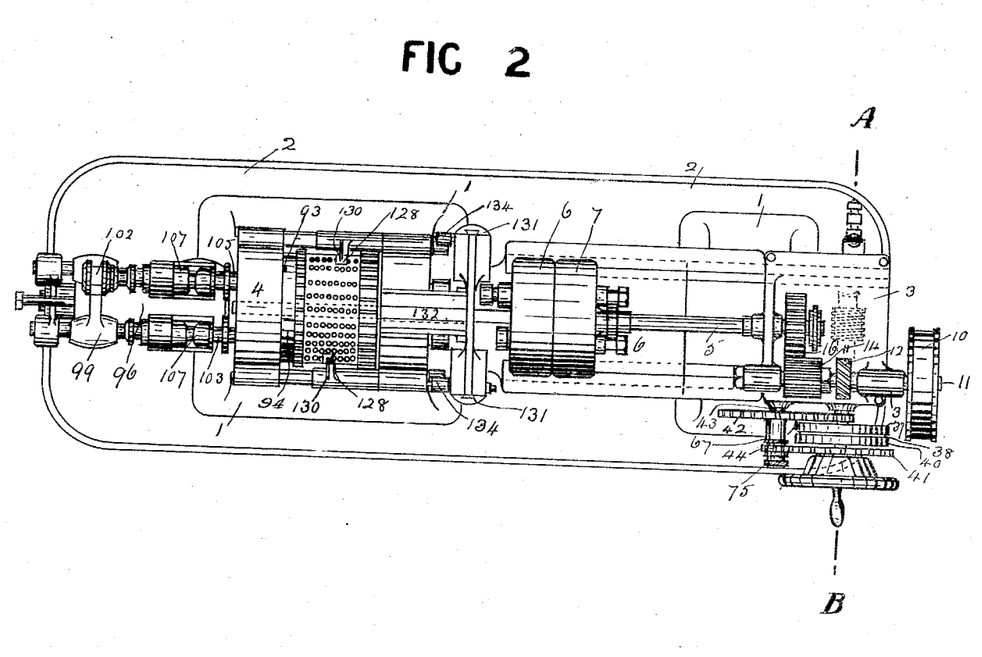
Fig. 2: is a plan of the same.
Figure 3:
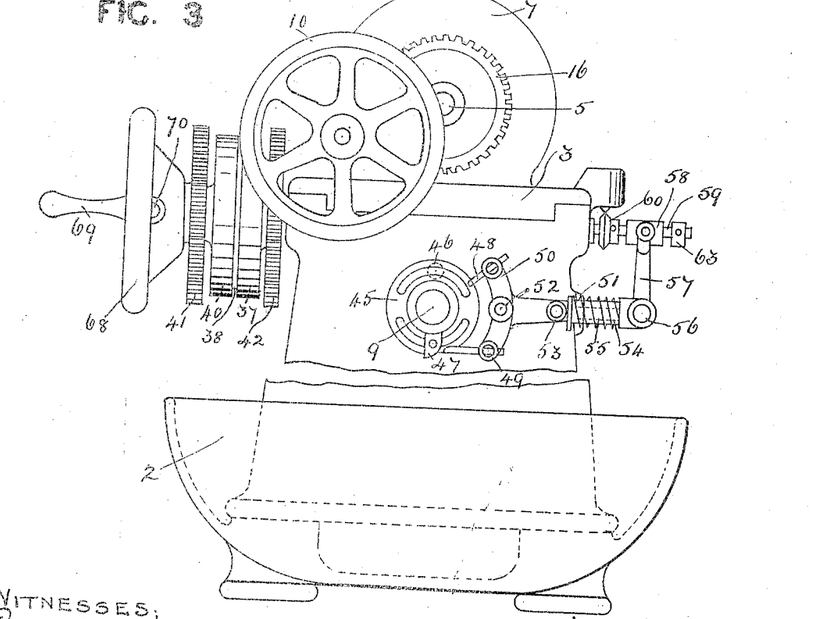
Fig. 3: is a right hand end elevation.
Figure 4:
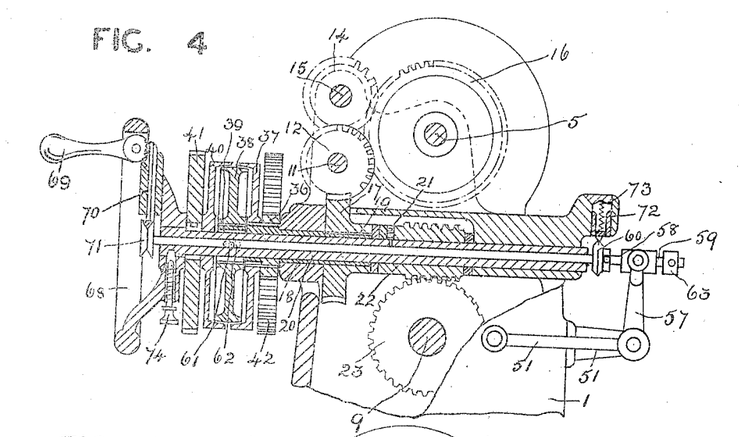
Fig. 4: is a sectional elevation at A. B.
Figure 5:
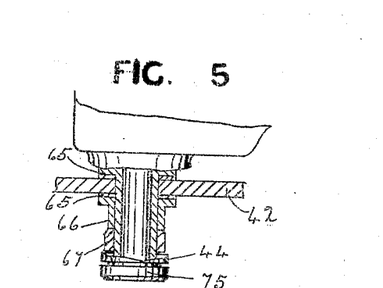
Fig. 5: is a sectional plan of the stud carrying the wheels for imparting a quick return to the tool head.
Figure 6:
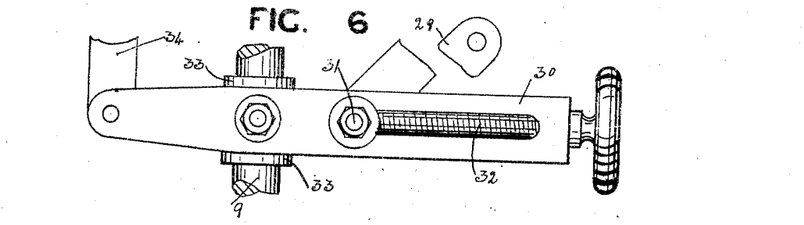
Fig. 6: is a front view of the link mechanism, detached from the lathe, by which the end tool holder is caused to advance and recede.
Figure 7:
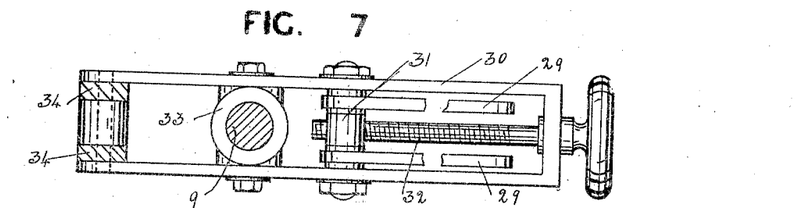
Fig. 7: is a plan of the same.
Figure 8:
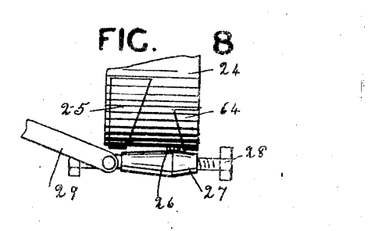
Fig. 8: is a front elevation of the sliding bracket operated by a cam for advancing and receding the said tool holder.
Figure 9:
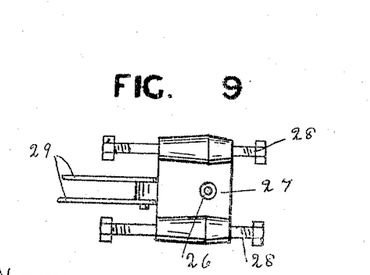
Fig. 9: is a plan of the same.
Figure 10:
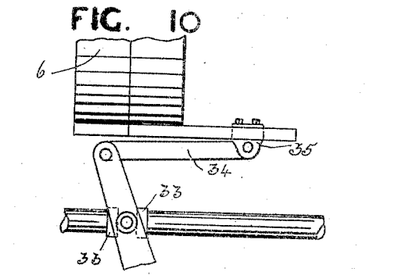
Fig. 10: is a front elevation of the upper portion of the link mechanism.
Figure 11:
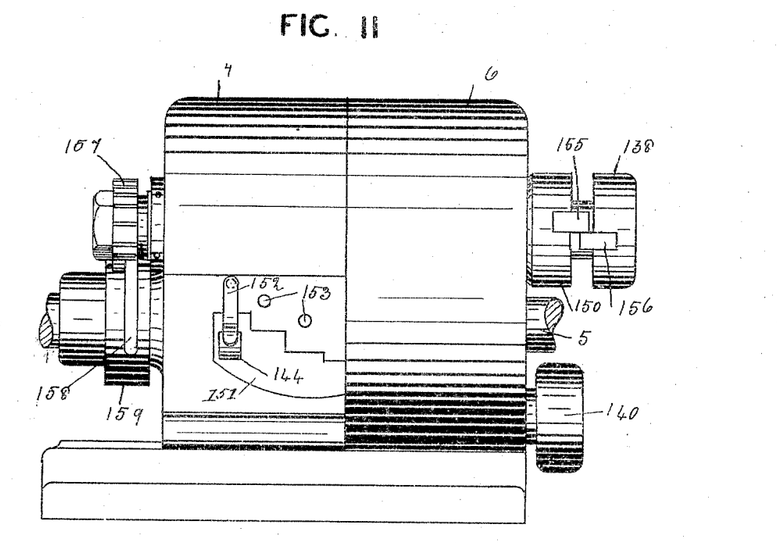
Fig. 11: is a rear elevation of the end tool holder and gear box.
Figure 12:
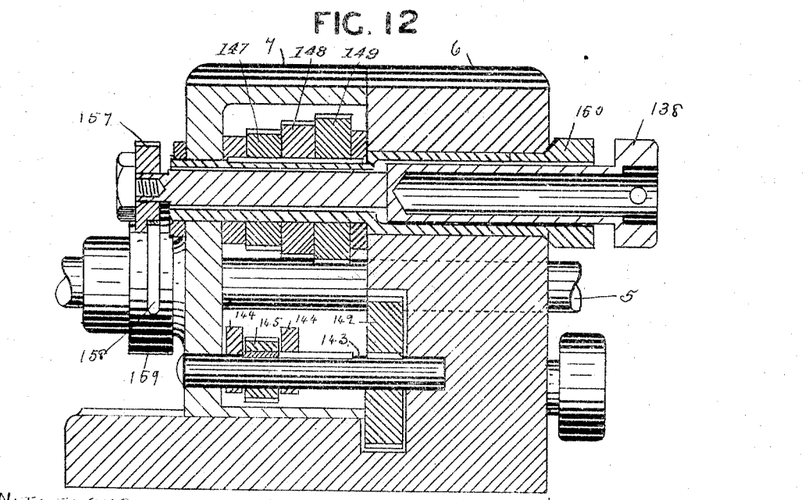
Fig. 12: is a sectional view of the same at C. D.
Figure 13:
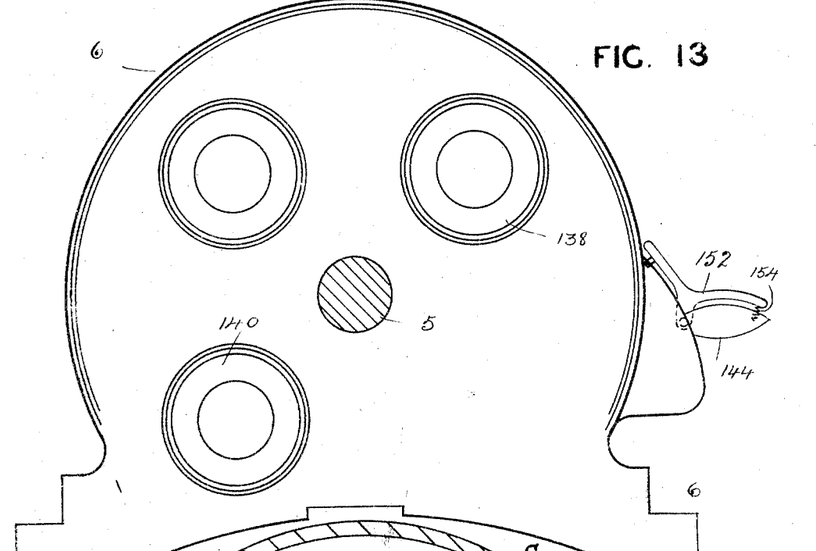
Fig. 13: is an end elevation of the end tool holder.
Figure 14:
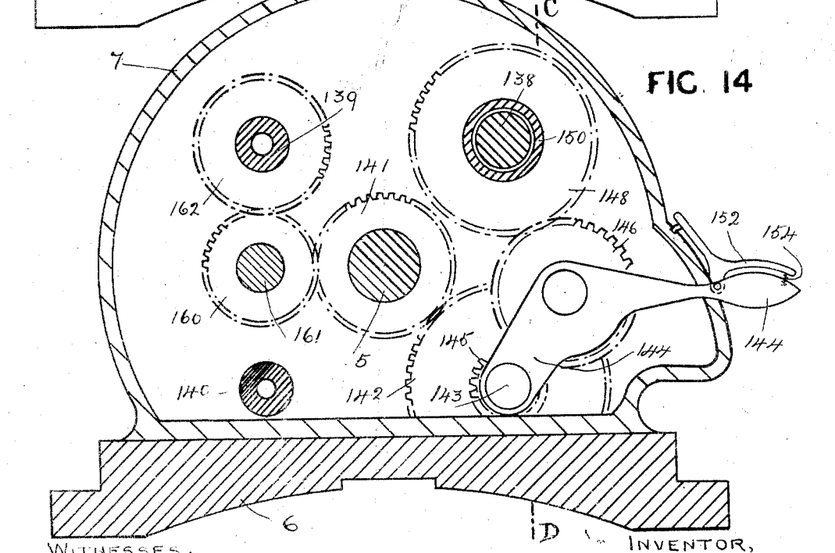
Fig. 14: is an end elevation of the gear box removed from the tool holder.

The cam shaft 9. rotates in one direction only for advancing and receding the tool holder 6. the advancing and receding being controlled by straps on the cam drum, as hereinafter set forth, the receding being quicker than the advance. Upon the sleeve 18. is a spur pinion 36. secured to an internally coned friction clutch 37, all rotating freely upon the hollow shaft in the position shown upon the drawings at Fig. 4. Inside the friction clutch 37. is an externally coned clutch 38. adapted to slide upon a key 39. in the hollow shaft 20. On the opposite side of the clutch 38. is another internally coned clutch 40. secured to a large spur wheel 41. both being free to rotate upon the hollow shaft 20. The spur pinion 36. meshes with a spur wheel 42. carried by a stud 43. which also carries a spur pinion 44. keyed thereon. Keyed upon and rotating with the cam shaft is a disk 45. carrying catches 46, 47 on either face; these catches coming into contact with the pins 48, 49. carried by arms of the rocking lever 50. pivoted to the bracket 51. at 52. When the catch 46. comes into contact with the pin 48. the rear end of the rocking lever 50. is depressed and with it the link 53, 54. formed in two parts and joined by a spigot and socket sliding connection, a spring 55. returning it to its normal position. The socket piece 54. is secured to a stud mounted in the bracket 51, this stud also carrying a forked lever 57. so arranged that when the socket piece is depressed the upper end of this forked lever pivoted to a sliding collar 58. is moved upon the shaft 59. until it strikes the collar 60. secured to the said shaft, moving it forward. This shaft 59. is secured to the clutch 38. by means of a key 61. sliding in a slot 62. in the hollow shaft 20. so that when the shaft 59. is moved forward in manner previously described the clutch 38. is brought into contact with the clutch 40. thereby securing the spur wheel 41. to the hollow shaft 20. The sleeve 18. and pinion 36. are now rotated by the skew gear wheel 17, the pinion 36. driving the spur wheel 42. at a reduced speed, the spur wheel 42. driving the pinion 44. which in turn drives the spur wheel 41. at a further reduced speed. The wheel 41. is now secured by the clutches 40 and 38. to the hollow shaft 20, which by the worm 21. and worm wheel 23. drives the cam shaft 9. at a reduced speed, thereby imparting to the end tool holder 6. a slow forward feed.

At the conclusion of the forward movement of the tool holder 6. the catch 47. strikes the pin 49, raising the lever 50. and causing the lever 57. and sliding collar 58. to move rearward until they strike the collar 63. moving the shaft 59. rearward bringing the clutch 38. into contact with the clutch 37, causing the hollow shaft 20. to rotate at the same speed as the sleeve 18. consequently driving the cam shaft at a quicker speed than for the forward movement, causing the tool holder 6. to recede more rapidly than it advanced, this receding of the tool holder being caused by the strap 64. on the cam coming into contact with the roller 26.

To prevent breakage or derangement of the machine in the event of any of the tools becoming dull, I mount the spur wheel 42. between leather or like washers 65. on the stud 43. I also provide upon this stud a sleeve 66. and a milled nut 67. by rotating which the sleeve 66. compresses the washers 65. against the wheel 42. By this means I am enabled to regulate the pressure so that the wheel 42. slips upon the stud 43. when the tool becomes dull or any abnormal pressure is brought upon the machine.

On the front end of the hollow shaft 20. I provide a hand wheel 68. by which the cam shaft and tool holder 6. is operated by hand, the clutch 38. being then in its central or inoperative position. The handle 69. is pivoted to the hand wheel and has teeth upon its rear end engaging teeth in a pointed plunger 70. so that when the handle is raised the plunger 70. is lowered into the conical groove in the collar 71. secured to the shaft 59. thereby retaining or bringing the clutch 38. into its inoperative position. When it is desired to drive the cam shaft by the engine, the handle 69. is lowered inside the hand wheel, the plunger 70. being raised out of the groove in the collar 71. thereby permitting the shaft 59. to move freely in either direction. To retain the clutch 38. in contact with the clutch 37. or clutch 40. I form the collar 60. with a conical periphery and over it mount a plunger 72. depressed by a spring 73. When the clutch 38. is in either operative position, the plunger is depressed on one side of the collar 60. and it consequently requires a substantial force to raise the plunger in order to permit the clutch to move into contact with either of the clutches 37. or 40. To alter the rate of advance of the tool head 6. the spur wheel 41. and pinion 44. may be removed and replaced by others of different proportions. To remove the spur wheel 41. the hand wheel 68. has to be first removed, this being done by withdrawing the plunger 74. when the hand wheel 68. and spur wheel 41. may be slid off. The pinion 44. is removed by unscrewing the milled nut 75. when the pinion may be removed and replaced by another.

Figure 16:
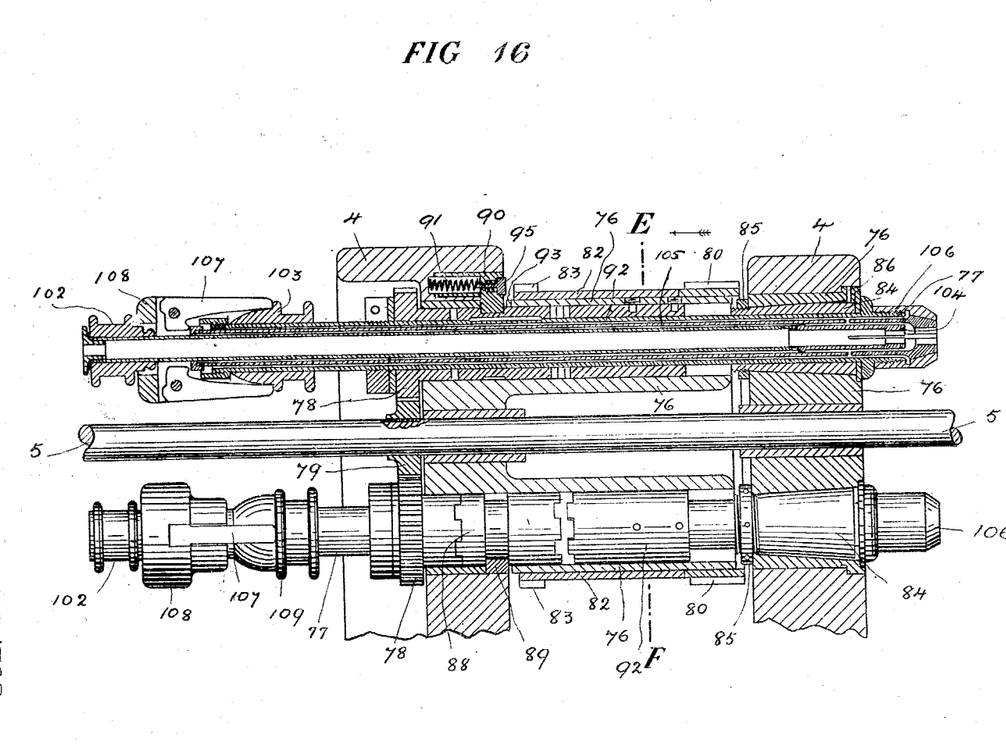
Fig. 16: is a sectional view of the headstock showing the upper spindle in section and the lower one in outside elevation.
Figures 17, 18, 19, 20, 21:
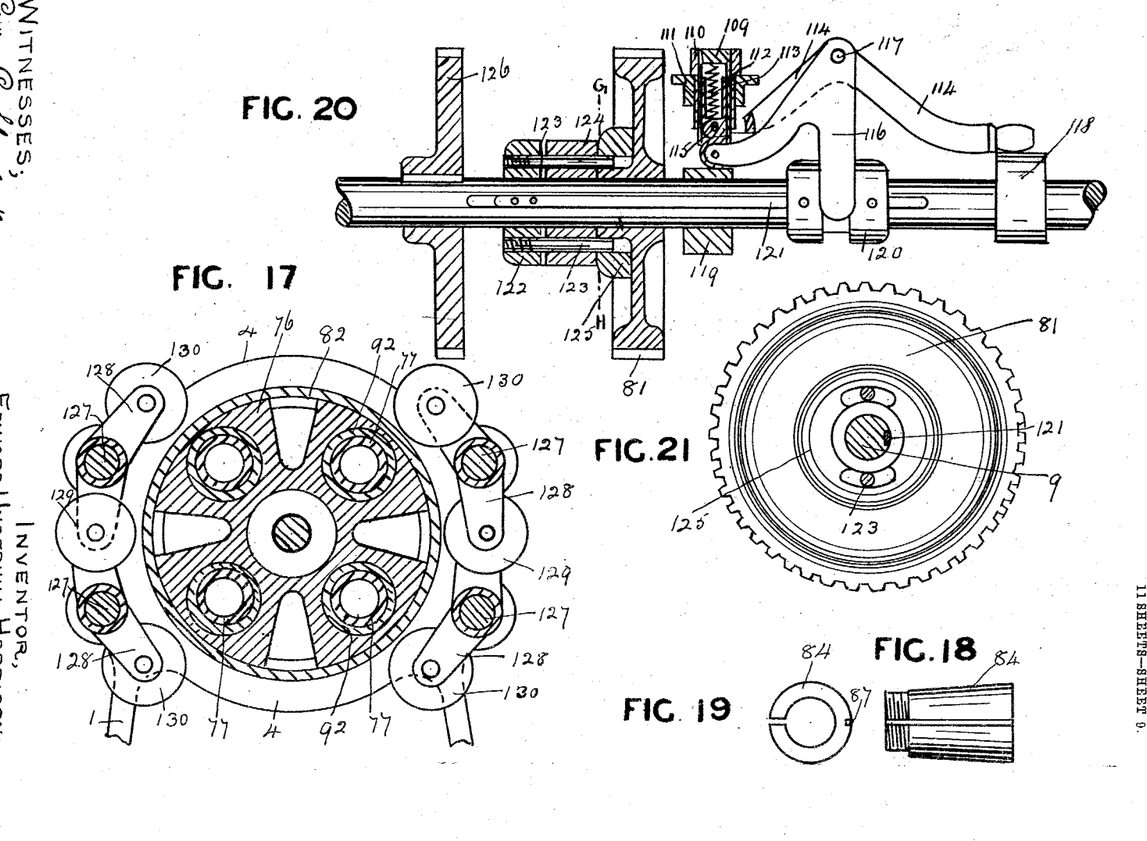
Figure 22:
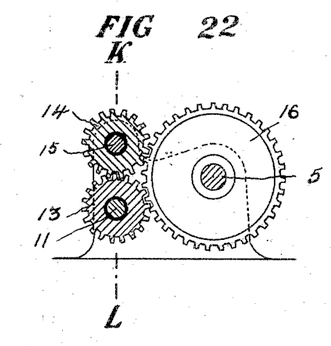
Fig. 22 is a transverse section at I—J, in Fig. 1, whereby the driving shaft is driven in either direction as desired.
Figure 23:
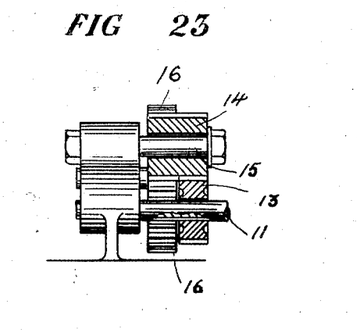
Fig. 23 is a longitudinal section of the same at K—L, in Fig. 22.
Figures 24, 25:
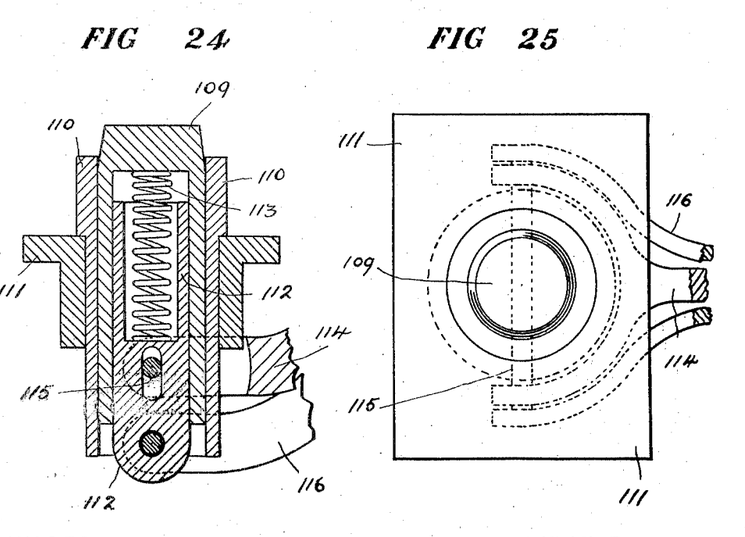
Fig. 24 is an enlarged view of the locking plunger shown by Fig. 20, the plunger being in its operated or locking position.
Fig. 25 is a plan of the same.
Figure 26:
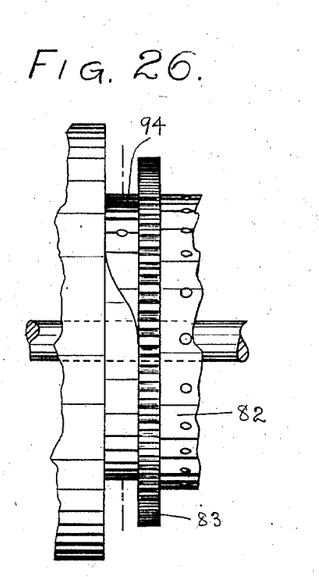
Figs. 26 and 27 are, respectively, an elevation and sectional end view of the extension 94.
Figure 27:
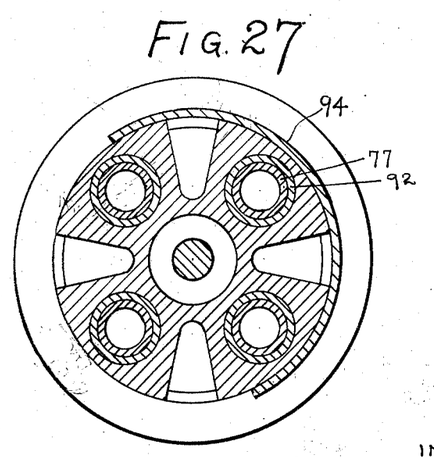

In the headstock 4. I mount a work spindle cylinder 76. carrying four work spindles 77. each carrying a pinion 78. rotated by a pinion 79. keyed to the main driving shaft 5; the work spindle cylinder 76. having secured to it a gear ring 80. meshing with and operated by a spur wheel 81. on the cam shaft 9. and adapted to advance each piece of work at the conclusion of each operation in the manner hereinafter set forth. Around the work spindle cylinder is a cam drum 82. for actuating the radial tools, this cam drum being continuously driven by a spur wheel 126. on the cam shaft. The work spindles 77. are mounted at the one end in conical liners or bearings 84. which are split longitudinally to allow their internal diameter to be adjusted. The work spindle cylinder is conically bored for the reception of the bearings, the adjustment being effected by nuts 85, pins 86, in the work spindle cylinder taking into a longitudinal groove 87. in the bearing 84. to prevent its rotation when being adjusted. The pinions 78. are loose upon the spindles and are provided on one face with a sleeve having on its end teeth which are adapted to engage with a sliding spool 88. keyed to the work spindles 77, the pinion 78. and spool 88. being shown in the drawings at Fig. 16. in gear and in their position for rotating the work spindles; in which position they are normally retained by a ring 89. broken away adjacent to the screwing position for the purpose hereafter set forth. When screwing is being performed upon the work in one spindle (the upper one shown in Fig. 16). the spindle is held stationary while the die rotates. For this purpose a horizontal plunger 90. is provided controlled by a spring 91; the lower portion of the plunger entering a groove in the spool 88; the spring forcing the spool into contact with the cylinders 92. secured to the work spindle 76. The end of the spindle cylinder holds the spool upon the spindle in which the work is being screwed, in gear with the pinion 78. when the work spindle cylinder is rotated. Upon the work spindle cylinder stopping, the plunger 90 is operated by the spring 91 and enters a notch 93 in the work spindle cylinder, moving the spool 88 into contact with the cylinder 92 locking the spindle and work spindle cylinder together, thereby enabling the screwing operation to be performed. On the end of the cam drum 82 is an extension 94 for substantially half of its circumference, and this extension is so arranged as to permit the plunger 90 operating the spool 88 to enter the notch 93 in the work spindle cylinder, and remain there during half a revolution of the cam drum i. e. while the screwing is being performed. At the conclusion of the screwing operation the extension 94 operates and withdraws the plunger 90 and spool 88 when the spindle and work again rotate, the screwing die being now stationary, thereby withdrawing the work from the screwing die as more fully explained hereinafter. To enable this projection 94 to make smoother contact with the plunger 90, I provide a secondary spring controlled plunger 95 which is located in the main plunger 90.

To enable the bar being worked to be fed forward at the completion of each cycle of operations, I form the work spindles of three tubular members, which rotate together, and are actuated as hereinafter described.

On the rear end of the cam shaft 9. I provide a cam drum 96. carrying two straps 97, 98, making contact with rollers on the underside of brackets 99, 100, sliding on stud 101. This cam drum is adjacent to the point at which the cycle of operations is concluded the upper portions of the brackets 99 and 100 entering the spools 102 and 103. respectively, carried by the work advancing spindle 104. and work locking spindle 105. respectively. On the forward end of the work spindle 77. I provide a cap 106. conically bored, against which the split conical end of the locking spindle abuts. At the conclusion of the cycle of operations upon one piece of work the spool 103. is moved to the right by the cam strap 98. and bracket 101. thereby releasing the pivoted fingers 107. carried on the collar 108. which normally abut against the end of the locking spindle 105. and also releasing the conical end of the spindle 105. from the cap 106. Immediately before this, the spool 102. and advancing spindle 104. is moved to the left by the cam strap 97. and bracket 99. and upon the locking spindle 105. being released the advancing spindle 104. is moved to the right advancing the rod being worked so that it may undergo another series of operations.

At the conclusion of each operation the work is advanced automatically to the next series of tools to undergo a further operation. Mounted upon the cam shaft 9. is a spur wheel 81. gearing with a gear ring 80. on the work spindle cylinder 76. and adapted to rotate it when the said wheel 81. is keyed to the cam shaft. The work spindle cylinder is held in position by a plunger bolt 109. working in a bush 110. in a bracket 111, carried by the bed 1, the nose of the said bolt 109, being adapted to enter holes in the underside of the work spindle cylinder 76. Inside the plunger bolt 109. is another plunger 112, a spring 113. being between these two plungers to facilitate their operation. The plunger bolt 109. is secured to the end of a pivoted forked lever 114, by a pin 115, working in a slot in the plunger 112, this plunger 112. being secured to and actuated by duplicate levers 116, which are pivoted at 117. as is also the forked lever 114. The plunger bolt 109. is withdrawn from the work spindle cylinder 76. by the forked lever 114. actuated by a cam 118. on the shaft 9. while it is raised to its locking position by a cam 119. which operates the plunger 112. raising it against the spring 113. and also the bolt 109. in an elastic manner until the end of the slot reaches the pin 115, when the bolt 109. is raised. The spur wheel 81. is normally free to rotate upon the cam shaft 9. but is automatically locked thereto at the conclusion of the operation upon the work so that the work spindle cylinder is rotated. This locking is controlled by the cam 119. actuating the duplicate levers 116. to which is secured the sliding spool 120. which actuates a key 121. sliding in the cam shaft. To the other end of this key 121. is secured a sliding disk 122. carrying pins 123. passing through a collar 124. When the spur wheel 81. is free upon the cam shaft 9. the pins do not enter the slots in the disk 125. secured to the spur wheel 81. the sliding key 121. having been moved to the left by the cam 119. At the conclusion of an operation upon the work the key 121. is moved to the right, the pins 123. entering the slots in the disk 125. and thereby causing the wheel 81 to rotate with the cam shaft 9. This spur wheel 81. gears with the gear ring 80. on the work spindle 76. which it then rotates for a quarter of a revolution advancing the spindles to undergo the next operation, when the pins 123, are again withdrawn and the wheel 81. becomes stationary upon the shaft 9.

Figure 15:
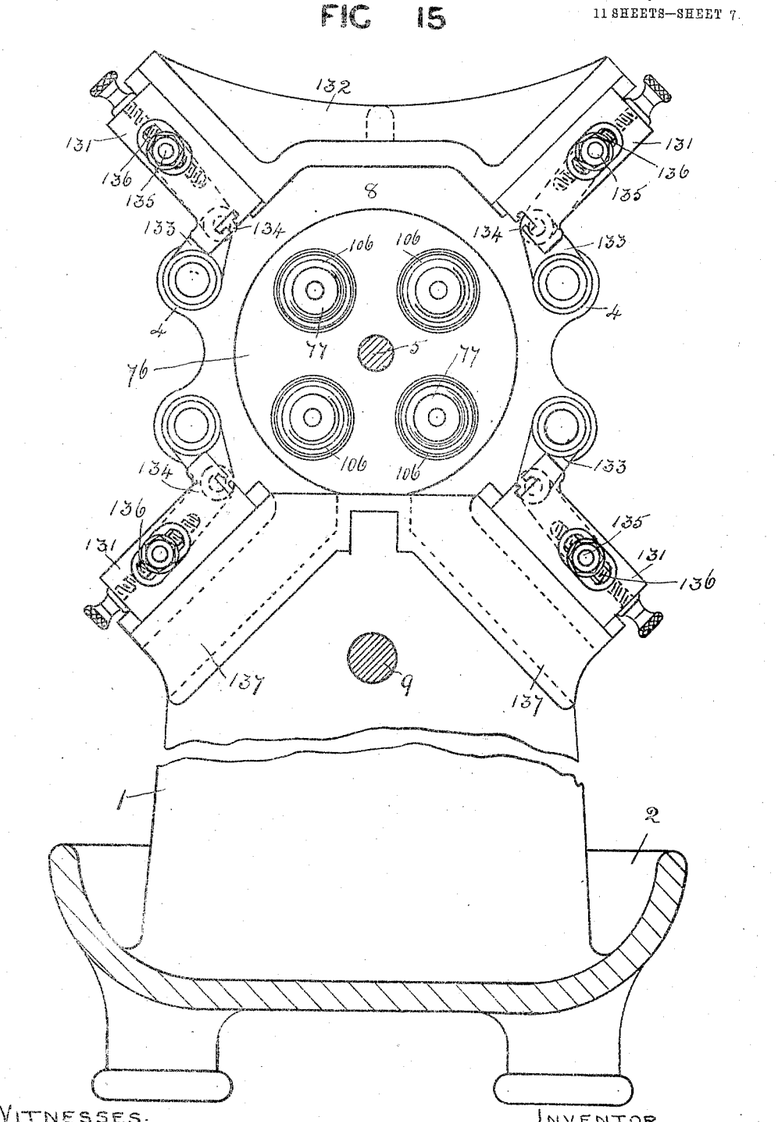
Fig. 15: is an end elevation of the radial tool holder.

The radial tools are actuated by means of cam dogs or removable catches on the cam drum 82, which is provided with tapped holes for their attachment. The cam drum is continuously rotated by a spur wheel 126. keyed upon the cam shaft which gears with the gear ring 83. on the said cam drum. Four rocking shafts 127. are mounted in the headstock 4, two being at the front and two at the rear of the machine. Each of these shafts 127, carry a rocking lever 128, which carry rollers 129. for advancing the tools carried by the slides 131; the shafts 127. also carrying rollers 130. for receding the said tools. The radial tools which operate upon the side of the work are carried by the tool slides 131, the lower two working upon beds formed upon the top of the main bed 1, while the other upper slides 131. are carried under a projecting bracket 132. secured to the top of the headstock 4. On the ends of the rocking shafts 127. are secured links 133. pivoted to links 134, (shown dotted in Fig. 15), secured to the tool slides 131. in manner hereinafter described. The tool slides 131 have slots in which work sliding nuts 135, secured to the tool holders by screws 136. by the rotation of which the position of the tools is set in advance. The tools are carried by an angle plate or equivalent secured to the inner ends of the tool slides 131. When the cam dogs on the cam drum 82. strike the advancing rollers 128. the shafts 127. are operated and also the links 133, and 134. bringing the tools into action where they remain until the cam dogs strike the return rollers 129. when the tool is withdrawn. There is a separate cam path and cam dog for each roller, so that each radial tool may be set independently of the others for a separate and different operation. Under the radial tools I form two hollow shafts 137. into which the turnings fall and are then deflected to the pan 2.

The end tools carried by the holder 6. in the illustration shown consist of a screwing die or tap carrying spindle 138. rotary box tool or drill holder spindle 139, and stationary box tool or drill holder spindle 140. The main driving shaft 5. passes through the tool holder 6. and gear box 7. and upon it is keyed a spur pinion 141. which gears with a spur wheel 142. carried by a secondary shaft 143. Pivoted upon this secondary shaft 143. is a forked lever 144. which slides along the said secondary shaft, taking with it the small pinion 145. Gearing with the pinion 145 is another pinion 146. also carried by the lever 144. and adapted to gear with one of the spur wheels 147. 148. 149. carried by the outer cylinder 150. of the screwing spindle 138. This pinion 146, may be put into gear with any one of the spur wheels 147, 148, 149; by raising or lowering the forked lever 144. within the slot 151, in the gear box 7, a pivoted catch 152. taking into holes 153, and actuated by a spring 154. being provided for retaining it in position. Motion is transmitted from the main driving shaft 5. to the outer cylinder 150. of the screwing spindle and thence to the screwing spindle proper 138. by means of the catches 155, 156, secured to the outer spindle 150, and screwing spindle 138. respectively. When a rod is being screwed the work spindle carrying it is held stationary as previously described, the screwing spindle and die being rotated. As the rod is screwed the spindle 138. advances until the catch 156 clears the catch 155, at which moment the ratchet wheel 157. comes into contact with the pawl 158. carried by a collar 159. upon the gear box 7, when further rotation of the die spindle is prevented. Simultaneously with the stoppage of the screwing spindle 138. the work spindle begins to rotate thereby withdrawing the work from the die. The spur wheel 141. gears with another wheel 160. carried by a secondary shaft 161, the wheel 160 gearing with a wheel 162. carried by the rotary box tool or drill holder spindle 139. which it rotates.

When it is desired to form a left hand thread upon the work, the long pinion 14. is removed and the wheel 13. pushed into gear with the wheel 16. it being mounted upon a sliding sleeve for this purpose.

What I claim then is:—

1. The combination, in a multiple spindle automatic lathe, of a bed, a shaft carried by said bed, a driving pulley on said shaft, a driving shaft and a cam shaft, a driving connection from the first-named shaft to the driving shaft, a connection from said first-named shaft to the cam shaft, an end tool holder, tool holder spindles carried in said tool holder and rotated by the driving shaft, a work spindle cylinder, a plurality of work spindles carried by said cylinder and driven by said driving shaft, and means for intermittently rotating said work spindle cylinder.

2. In a multiple automatic lathe, the combination of a cam shaft, a cam drum arranged for rotation, and operated by said cam shaft, a plurality of side tool holders arranged radially to the axis of said cam drum, and a plurality of cam paths upon said drum for advancing and receding said side tool holders independently and separately.

3. In a multiple spindle automatic lathe, the combination of a cam shaft, an end tool holder, a cam drum on said cam shaft, slotted link mechanism pivoted upon said cam shaft and connected at one end to said end tool holder, a nut in said slotted links, a screw in said links for operating said nut, a sliding bracket actuated by said cam drum and a link connecting said sliding bracket to said nut and slotted links for imparting a variable longitudinally reciprocating movement to said end tool holder.

4. In a multiple spindle automatic lathe, the combination of a short shaft, a driving pulley, on said shaft, an end tool holder, a work spindle cylinder, a hollow transverse shaft having driving connections with said short shaft, a cam shaft driven by said hollow shaft and connected for operating the end tool holder and work spindle cylinder, means for driving the hollow transverse shaft comprising a friction clutch freely mounted on the said hollow transverse shaft, a pinion secured to said clutch and gearing with a pinion mounted on a secondary shaft, a second friction clutch freely mounted on said hollow transverse shaft, and gearing with another pinion on said secondary shaft, a second transverse shaft inside said hollow shaft, a two faced friction clutch longitudinally movable on said hollow shaft, and connected to said inner shaft and means for automatically operating said inner shaft and clutch so that it may engage either of the two clutches for the purpose of driving the said cam shaft at different speeds for imparting a slow advance and quick return to the end tool holder and quick rotation to the work spindle.

5. In a multiple spindle automatic lathe, comprising a work spindle cylinder, a cam drum rotatable around said work spindle cylinder, a radially movable side tool holder, means for advancing and receding said side tool holder, a rocking shaft suitably supported, rocking arms on the said shaft carrying rollers actuated by the said cam drum for effecting the rocking of the shaft, a link arm on the other end of the shaft connected to the side tool holder for advancing and receding the said tool holder upon the rocking of the shaft.

6. In a multiple spindle automatic lathe, the combination of a work spindle cylinder, a plurality of work spindles located therein a driving shaft, a pinion thereon pinions free on said work spindles and having a clutch end and meshing with and driven by the pinion on said driving shaft, a cylindrical clutch secured to said work spindle cylinder and having a clutch end, a sliding spool on said spindle located between said pinions and cylindrical clutch and formed to provide clutches at either end, said cylindrical clutch being in alinement with said clutches, a gapped ring located around the work spindle cylinder engaging and normally holding a plurality of said spools in engagement with the said pinions, a plunger engaging the spool on the spindle carrying the work to be screwed, a spring for operating the plunger and bringing said spool into engagement with said cylindrical clutch and thereby locking the work spindle to the work spindle cylinder, and means for releasing said spindle at the conclusion of the operation.

In testimony whereof, I have signed my name to this specification in the presence of two subscribing witnesses.

EDWARD UNDERHILL HARRISON

Witnesses:
HAROLD J. C. FORRISTER,
STANLEY BAURER.